United States Patent

[11] 3,575,657

| [72] | Inventors | Leonard Dubrowsky<br>East Meadow, N.Y.;<br>Stuart S. Morwitz, Tampa, Fla. |
|---|---|---|
| [21] | Appl. No. | 824,646 |
| [22] | Filed | May 14, 1969 |
| [45] | Patented | Apr. 20, 1971 |
| [73] | Assignee | the United States of America as represented by the Secretary of the Navy |

[54] MICROWAVE DETECTOR MOUNT AND POWER BRIDGE CIRCUIT
2 Claims, 3 Drawing Figs.

[52] U.S. Cl. .................................................. 324/95, 324/106
[51] Int. Cl. ...................................................... G01r 21/04, G01r 5/26
[50] Field of Search ............................................ 324/95, 106

[56] References Cited
UNITED STATES PATENTS
| 2,496,879 | 2/1950 | Lafferty | 324/95X |
| 3,081,430 | 3/1963 | Hopfer | 324/95X |
| 3,237,101 | 2/1966 | Vaughn | 324/95 |
| 3,345,561 | 10/1967 | Martin | 324/95 |
| 3,384,819 | 5/1968 | Rinkel | 324/95 |
| 3,440,536 | 4/1969 | Ronci | 324/106 |

*Primary Examiner*—Rudolph F. Rolinec
*Assistant Examiner*—Ernest F. Karlsen
*Attorneys*—E. J. Brower, A. W. Collins and S. J. Bor ABSTRACT: A microwave bolometer mount and an associated temperature compensated power bridge circuit having a pair of matched barretters located in the same metal mass in close thermal proximity to each other. Only one of the bolometer elements is positioned so that it will absorb the microwave energy applied from an external source while the other element is free from any microwave influence. The matched barretters comprise a pair of complementary Wheatstone Bridge arms whereby the fluctuation of the quantity of power measured caused by the ambient temperature changing is essentially canceled out.

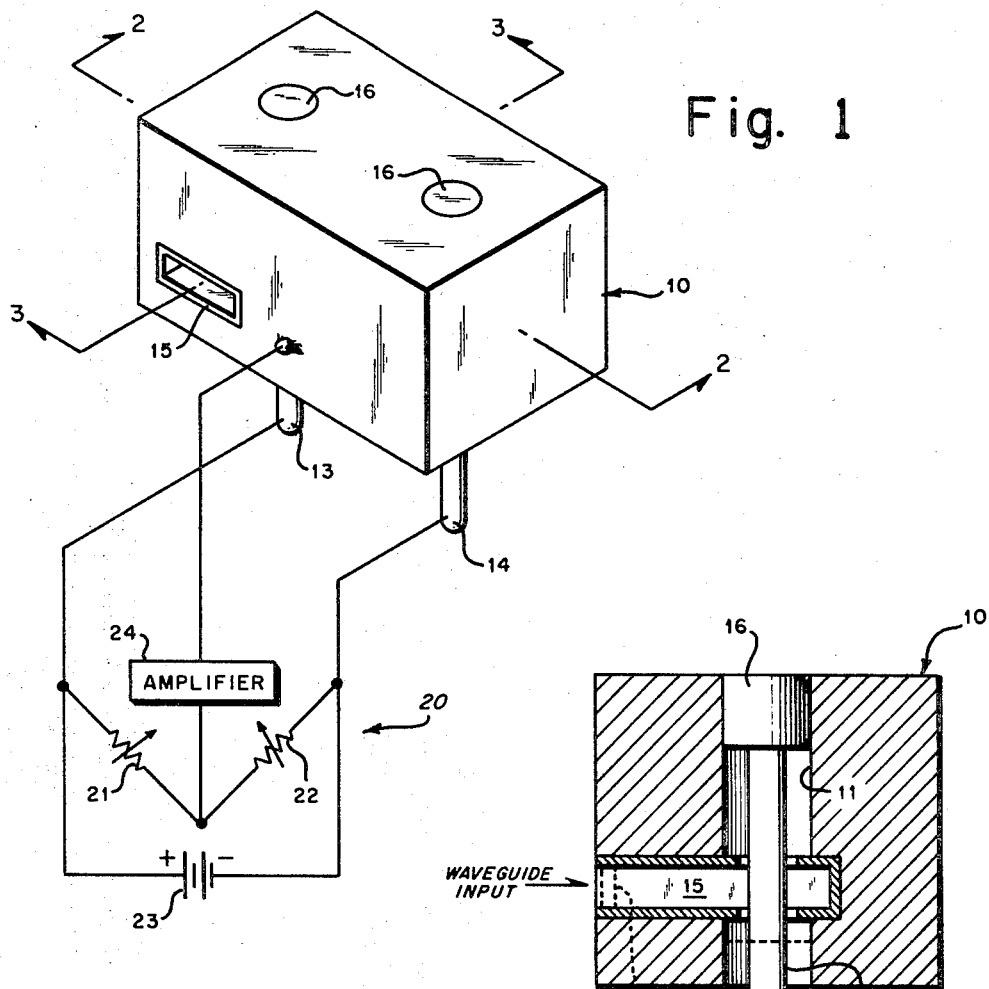
Fig. 1
Fig. 3
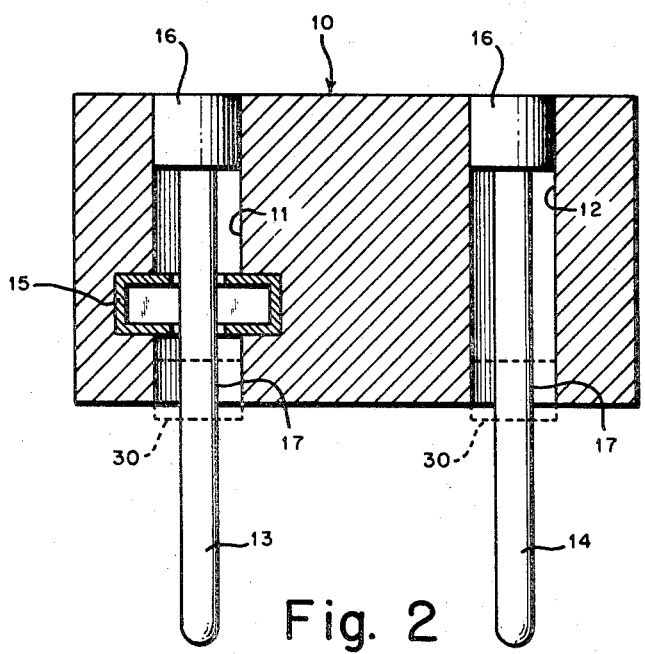
Fig. 2
INVENTORS
LEONARD DUBROWSKY
STUART S. HORWITZ
BY
*Arthur L. Collins*
ATTORNEY

MICROWAVE DETECTOR MOUNT AND POWER BRIDGE CIRCUIT

The present invention relates to a microwave detector mount and more particularly to a highly sensitive bolometer mount utilizing dual barretters for use with a microwave power bridge to provide long term stability and substantial insensitivity to ambient temperature changes.

Presently, one of the most universally used methods of measuring microwave power is by means of a bolometer element, which operates in a bridge circuit and changes RF or microwave energy into heat energy. This conversion causes the resistance of the bolometer to change in proportion to the energy or heat applied, unbalancing the bridge. The change in resistance can be measured and used to determine the amount of energy applied. However, conventional bolometer bridge techniques have a serious limitation because of thermal drift in the mount holding the bolometer element. Since the bolometer is a temperature-sensitive element, power of all types, including ambient temperature change, causes a change in the resistance of the element. Therefore, the basic problem with using temperature-sensitive bolometers to measure small changes in microwave power is that ambient temperature changes produce an erroneous indication of apparent power level changes.

According to the present invention, a pair of identical barretters are located in the same thermal environment, so that they are both at the same ambient temperature and changes therein affect both equally. The value of the resistance of one barretter is determined by both the ambient temperature and the amount of microwave power impinging thereon, while the resistance value of the second barretter is determined by the ambient temperature only. With the appropriate external Wheatstone Bridge circuit, the ambient temperature information obtained from the second or reference barretter can be used to cancel the effects ambient temperature change on the measuring barretter, thus yielding an accurate measure of transmitted microwave power.

Accordingly, it is therefore an object of the present invention to provide a novel and improved microwave detector mount for stable power measurements.

It is a further object of the present invention to provide a novel and improved microwave bolometer circuit configuration which exhibits long term stability and is substantially immune to ambient temperature variations.

It is another object of the present invention to provide a novel and improved microwave power bridge detector which is relatively simple in construction and operation and yet highly reliable in use.

Other objects and many of the attendant advantages of the invention will be readily appreciated as the same becomes better understood by reference to the following detailed description when considered in connection with the accompanying drawing wherein:

FIG. 1 of the drawing is a pictorial representation, part in an enlarged perspective view and part in a schematic diagram, of a preferred embodiment of the invention;

FIG. 2 of the drawing is a cross-sectional view taken substantially on line 2-2 of FIG. 1, looking in the direction of the arrows; and FIG. 3 of the drawing is a cross-sectional view taken substantially on line 3-3 of FIG. 1, looking in the direction of the arrows.

Referring now to the details of the three FIGS. of the drawing, wherein like reference numerals apply to like parts throughout, a bolometer method of measuring power at microwave frequencies is shown with compensation for changes in the ambient temperature and for associated temperature changes in the bolometer mount. The bolometer mount 10 is a solid, thermally conductive, generally rectangular metal block which limits, as much as possible, the rate of temperature changes of the bolometer elements employed, and also forms the outside boundaries of the bolometer detector itself. A pair of parallel cylindrical channels 11 and 12 are provided in the mount 10 projecting through the mount from the top to the bottom surfaces thereof. Concentrically mounted in each of the channels 11 and 12 are a pair of matched, identical barretters 13 and 14 respectively, preferably constructed from very fine platinum wire or from any other suitable, conventional metal having the property of long term stability. The barretter 13, whose operation will become more apparent hereinafter, is the microwave or measuring element of the system and is coupled to a waveguide-to-coaxial adapter 15 which is provided as the termination in the microwave circuit to be monitored. The adapter 15 is housed within the mount 10 in an opening or passageway provided in its front face in the exact shape thereof so that the rate of temperature change of the adapter is also limited as much as possible. The front waveguide portion of the adapter 15 is positioned to be flush with the front face of the mount 10 and accepts the waveguide energy input there.

Both of the channels 11 and 12 are sealed and are airtight at the top surface of the mount 10 by a mating cylindrical metal plug 16, preferably constructed from the same material as the mount 10. It is to be noted that the barretters 13 and 14 may be secured to the plugs 16 at their upper ends to provide a means for positioning the barretters concentrically in the channels 11 and 12 to also connect the barretters together electrically at a common junction point, the necessity of which will become more apparent when the associated bridge circuit is described. A pair of RF-bypass capacitors 17 are provided at the apertures on the bottom surface of the adapter 15 and the channel 12 through which the barretters 13 and 14 respectively extend, thereby to minimize leakage at these points.

The preferred embodiment of the power measuring circuit is shown as a temperature compensated Wheatstone Bridge arrangement 20. The individual arms of the bridge circuit 20 comprise a pair of variable resistors 21 and 22 and the matched external barretters 13 and 14 respectively. A source of battery power 23 is connected across one of the diagonals of the bridge circuit 20 and a stable indicator amplifier element or, if preferred, a direct reading meter 24 is connected across the other diagonal of the bridge and functions as a detector element. It is to be noted that the common junction point where the two barretters and the amplifier 24 are connected together is the detector mount 10 itself, it being made from a conductive metal as are the plugs 16 which, as previously disclosed, are the actual barretter connections to the mount 10 and the bridge 20.

In operation, sufficient power is initially supplied by the battery 23, so that the resistance of the two bolometers 13 and 14 are made equal to their normal operating resistance. The remaining bridge resistors 21 and 22 are varied until the resistance is selected that will balance the bridge in this condition, that is, before any microwave input is applied to the measuring barretter 13. When microwave power is supplied to the bridge, the barretter 13 heats, its resistance changes, and the bridge 20 becomes unbalanced, which unbalance is detected by the indicating amplifier 24. It is to be noted that the bridge circuit 20 may be operated either as a balanced or unbalanced bridge, that is, the voltage across the amplifier element 24 may be reduced to a null by adjusting the variable resistors 21 and 22 to produce a balance in the bridge 20, or the amount may be measured and will be proportional to the microwave power to be determined.

It is desirous, as previously disclosed, that the bridge sensitivity should be independent of ambient temperature changes and that the bridge should not drift from a condition of balance or unbalance as the temperature varies. To prevent this from happening, the circuit 20 employs the barretter 14 as a temperature compensating or reference element to prevent the aforementioned thermal error. The two barretters 13 and 14 are positioned to be in very close thermal proximity to each other, preferably not more than 0.020 inch apart. The design of the mount 10 and the barretter mounting procedure provides for the nearly identical thermal environment for the two bolometer elements, with the added feature of only coupling microwave power to one barretter 13 while shielding the other 14 from any microwave influence. Therefore, any increase or decrease of ambient temperature will tend to change the operating resistance of both barretters equally. But so long as the temperature sensitivity of the two barretters tracks with temperature and they are both maintained in close thermal proximity to each other, any thermal errors caused by temperature effects are essentially canceled out. By adjusting the resistors 21 and 22 while microwave energy is being applied to the waveguide input of the adapter 15, the bridge circuit 20 can be balanced so that the change in the resistance of the resistors 21 and 22 will compensate for the change due to microwave energy impinging on the measuring barretter 13. Also, as previously disclosed, an unbalanced measurement system may be used if preferred, with equal results. One way to accomplish this would be to make the resistors 21 and 22 equal in value and provide an AC bias on the barretter 14 to make its resistance identical to the barretter 13. As the microwave energy input impinging on the barretter 13 changes its resistance, the bridge becomes unbalanced and produces an output voltage across the amplifier element 24. The change in the resistance of the barretter 13 would, of course, be due to the change in temperature caused by the increase in absorbed microwave energy.

In practice, it has been found that the difference in temperature between the two barretters can be held to approximately 0.0066° C. Calculations show that for this variation in barretter temperature, the detector mount and associated system is accurate to within 0.004 db. In addition, by choosing and maintaining the voltage standing-wave ratio of the adapter 15 and any associated waveguide elements at a very low value, preferably less than 1.03, and by using platinum barretter elements, increased accuracy and extremely long term stability may be attained. Another preferred way in which the accuracy of the system can be improved would be to evacuate and seal the two barretter channels 11 and 12 so that there would be no air flow at all around the two barretters 13 and 14. As indicated by the dotted outline of the solid, cylindrical plug members 30 and of the microwave window 31 in the drawing, it is possible to completely seal the two channels from the ambient air. By merely evacuating both channels, placing a microwave window on the adapter 15 and sealing the two channels at the bottom surface of the mount 10 with a nonconductive plug member 30, it is possible to prevent the flow of air around the barretters and to hold them in a vacuum at identical temperatures, thereby assuring that the sensitivity of the bridge circuit 20 is made independent of any ambient temperature changes.

Obviously many modifications and variations of the present invention are possible in the light of the above teachings. It is therefore to be understood that within the scope of the appended claims, the invention may be practiced otherwise than as specifically described.

We claim:

1. Microwave power measurement apparatus comprising:
   a. a first platinum wire barretter bolometer element;
   b. a second platinum wire barretter bolometer element;
   c. a solid thermally and electrically conductive metallic block having a pair of parallel cylindrical channels that extend therethrough said pair of cylindrical channels being evacuated and having a nonconductive cylindrical plug positioned in the outer end of each said channel;
   d. a thermally and electrically conductive metallic plug which is positioned in one end of each channel and which respectively secure the bolometer elements in the channels;
   e. microwave input means including a waveguide-to-coaxial adapter housed in a passageway in the metallic block and coupled to the first bolometer element for directing the microwave energy to be measured against the first bolometer element said passageway having a microwave window thereacross to block the two channels from ambient air flow; and
   f. a circuit which includes the electrically connected first and second bolometer elements, a pair of variable resistors, an electrical power source, and an electrical current detector connected in a Wheatstone Bridge configuration.

2. The apparatus substantially as described in claim 1 wherein the parallel cylindrical channels are approximately 0.020 inch apart.